United States Patent
Hasberg et al.

(10) Patent No.: US 12,304,501 B2
(45) Date of Patent: May 20, 2025

(54) METHOD FOR PROVIDING OPERATING DATA FOR AN AT LEAST SEMI-AUTOMATED VEHICLE

(71) Applicant: Robert Bosch GmbH, Stuttgart (DE)

(72) Inventors: Carsten Hasberg, Ilsfeld-Auenstein (DE); Andre-Marcel Hellmund, Hockenheim (DE); Philipp Rasp, Reusten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 247 days.

(21) Appl. No.: 17/895,392

(22) Filed: Aug. 25, 2022

(65) Prior Publication Data
US 2023/0076075 A1    Mar. 9, 2023

(30) Foreign Application Priority Data
Sep. 6, 2021   (DE) ............... 10 2021 209 781.2

(51) Int. Cl.
*B60W 40/09* (2012.01)

(52) U.S. Cl.
CPC ....... *B60W 40/09* (2013.01); *B60W 2420/408* (2024.01); *B60W 2552/53* (2020.02); *B60W 2554/4041* (2020.02)

(58) Field of Classification Search
CPC .......... B60W 40/09; B60W 2420/408; B60W 2552/53; B60W 2554/4041; G08G 1/0112; G08G 1/04; G08G 1/096725; G08G 1/167; G08G 1/164
See application file for complete search history.

(56) References Cited

U.S. PATENT DOCUMENTS

| | | | |
|---|---|---|---|
| 2017/0016740 A1* | 1/2017 | Cui | G01C 21/30 |
| 2020/0394906 A1* | 12/2020 | Kim | G06T 19/006 |
| 2021/0020048 A1* | 1/2021 | Perko | G08G 1/096758 |
| 2021/0033410 A1* | 2/2021 | Niemiec | G08G 1/096811 |
| 2021/0188273 A1* | 6/2021 | Katriniok | G08G 1/161 |
| 2021/0269059 A1* | 9/2021 | Djuric | B60W 60/0011 |
| 2021/0304607 A1* | 9/2021 | Grace | G08G 1/166 |
| 2022/0204026 A1* | 6/2022 | Kim | B60W 60/0015 |
| 2023/0029093 A1* | 1/2023 | Pedersen | G08G 1/09675 |

(Continued)

FOREIGN PATENT DOCUMENTS

| | | |
|---|---|---|
| DE | 102014215980 A1 | 2/2016 |
| DE | 102016112913 A1 | 1/2017 |

(Continued)

*Primary Examiner* — Rami Khatib
(74) *Attorney, Agent, or Firm* — NORTON ROSE FULBRIGHT US LLP (57) ABSTRACT

A method for providing operating data for an at least semiautomated vehicle. The method includes: sensorially detecting surroundings data with the aid of a surroundings sensor system of the vehicle; conveying the sensorially detected surroundings data to a cloud and conveying a request to the cloud for localization data; receiving the localization data from the cloud; and ascertaining the operating data for use in a cooperative driving maneuver of the vehicle with at least one further road user from the localization data received from the cloud and from the sensorially detected surroundings data; and initiating the cooperative driving maneuver using the ascertained operating data.

8 Claims, 4 Drawing Sheets

(56) References Cited

U.S. PATENT DOCUMENTS

2023/0274637 A1* 8/2023 Mizoguchi ............. G08G 1/052
 701/119
2024/0092382 A1* 3/2024 Sabatini ............ B60W 30/0956

FOREIGN PATENT DOCUMENTS

DE 102018215305 A1 3/2020
EP 2724911 A1 4/2014

* cited by examiner

METHOD FOR PROVIDING OPERATING DATA FOR AN AT LEAST SEMI-AUTOMATED VEHICLE

CROSS REFERENCE

The present application claims the benefit under 35 U.S.C. § 119 of German Patent Application No. DE 10 2021 209 781.2 filed on Sep. 6, 2021, which is expressly incorporated herein by reference in its entirety.

FIELD

The present invention relates to a method for providing operating data for an at least semi-automated vehicle. The present invention further relates to a device for providing operating data for an at least semi-automated vehicle. The present invention further relates to a computer program. The present invention further relates to a machine-readable memory medium.

BACKGROUND INFORMATION

In the future, there will be a variety of assisted and automated driving functions. Digital maps play a decisive role in the implementation of these functions, in particular, in situations, in which today's systems are limited by the narrow range of sensors. Situations, in which the number of usable traffic lanes changes may, for example, be the following:
  end of the vehicle's traffic lane
  adjacent traffic lane ends, for example, highway on-ramp areas on rural roads, in which a passing is permitted or prohibited.

German Patent Application No. DE 10 2016 112913 A1 describes a processor, which is configured to receive image data, which are collected by a vehicle camera and which relate to a fixed surroundings feature. The processor is also configured to determine a vehicle position with respect to the fixed surroundings feature and to determine a traffic lane-related vehicle location on a digital map based on the vehicle position with respect to the fixed surroundings feature.

European Patent No. EP2724911A1 describes a driving assistance method for increasing driving comfort, a state of a road section to be negotiated and traffic lanes of the road section to be negotiated being detected and a traffic lane recommendation for the road section to be negotiated being issued.

SUMMARY

An object of the present invention is to provide an improved method for providing operating data for an at least semi-automated vehicle.

According to one aspect of the present invention, the object is achieved with a method for providing operating data for an at least semi-automated vehicle. According to an example embodiment of the present invention, the method includes the following steps:
  sensorially detecting surroundings data with the aid of a surroundings sensor system of the vehicle;
  conveying the sensorially detected surroundings data to a cloud and conveying a request to the cloud for localization data,
  receiving the localization data from the cloud; and
  ascertaining the operating data for use in a cooperative driving maneuver of the vehicle with at least one further road user from the localization data received from the cloud and from the sensorially detected surroundings data and initiating the cooperative driving maneuver using the ascertained operating data.

In this way, the localization task is advantageously carried out in part by a very powerful processing unit of the cloud and only a minimum data volume of localization data is required to be transferred into the vehicle, which may be implemented with a narrow bandwidth of the communication link to the cloud. In this way, a smooth traffic event in sections including changing traffic lanes may be facilitated. An application to multilane roadways, in which passing maneuvers are also possible, is also conceivable. As a result, the passing maneuvers may be carried out in a better and safer manner.

According to one second aspect of the present invention, the object is achieved with a device for providing operating data for an at least semi-automated vehicle. According to an example embodiment of the present invention, the device includes:
  a first interface for the wireless connection to a cloud for receiving localization data from the cloud,
  a second interface for feeding sensorially detected surroundings data;
  an ascertainment unit, which is designed to ascertain the operating data relating to a cooperative driving maneuver for the vehicle from the received localization data and from the sensorially detected surroundings data; and
  a third interface, via which the operating data are outputable.

According to one third aspect of the present invention, the object is achieved with a computer program including commands which, when the computer program is executed by a computer, prompt the computer to carry out the described method according to the present invention.

According to one fourth aspect of the present invention, the object is achieved with a machine-readable memory medium, on which the computer program is stored.

Advantageous refinements of the method according to the present invention are disclosed herein.

One advantageous refinement of the method of the present invention provides that the localization data received from the cloud include at least one of the following: distance of the vehicle to a lane change zone, length of the lane change zone, position of the vehicle.

One further advantageous refinement of the method of the present invention provides that the sensorially detected surroundings data of the vehicle are detected with the aid of at least one of the following: radar sensor, LIDAR sensor, ultrasonic sensor, camera. As a result, static surroundings features as well as a vehicle entering into the lane change zone, for example, may be sensorially easily detected.

One further advantageous refinement of the method of the present invention provides that the localization data received from the cloud are displayed in an electronic horizon of the vehicle. A good information display for a driver of a vehicle is advantageously facilitated as a result.

One further advantageous refinement of the method of the present invention provides that the conveyance of a request to the cloud for data relating to cooperative driving of the vehicle is carried out when the vehicle enters into a defined mapping area of a digital map. In this way, the map material in the mapping cloud may be utilized in a "segmented" manner and as a result may be provided optimized.

One further advantageous refinement of the device of the present invention provides that device is designed to display the received localization data of the mapping cloud with the aid of an electronic horizon.

Further measures explaining and improving the present invention are explained in greater detail below together with the description of preferred exemplary embodiments of the present invention with reference to multiple figures.

DETAILED DESCRIPTION OF EXAMPLE EMBODIMENTS

The present invention provides a more efficient and cost effective method for providing and for using operating data for a cooperative driving. For this purpose, after a request of a vehicle to a cloud (which is designed, for example, for mapping purposes), specific localization data are ascertained by the cloud, which are conveyed wirelessly to the requesting vehicle. Together with the localization data received from the cloud and sensorially detected surroundings data, operating data are ascertained for implementing a cooperative maneuver.

So-called "operating data" are understood below to mean data for operating an at least semi-automated vehicle such as, for example, data for activating steering elements, data for activating drive elements, data for activating brake elements, data for activating or adjusting sensor units and the like. Using such operating data, the at least semi-automated vehicle is able as a result to carry out a defined driving maneuver effectuated at least partially by the operating data. It is self-evident that the operating data cited are enumerated merely as an example.

With the described method, advantageously only small amounts of data are required to be transferred into the at least semi-automated vehicle, which may advantageously mean a reduced transferring effort. A computing time and relating to the localization of the vehicle is advantageously "outsourced" from the vehicle "into the cloud." In this way, a creation, provision and use of a digital localization map with a feature density adapted as needed are implemented.

The wording "at least semi-automated driving" includes one or multiple of the following cases: assisted driving, semi-automated driving, highly-automated driving, fully-automated driving.

Assisted driving means that a driver of the motor vehicle continually carries out either the transverse guidance or the longitudinal guidance of the vehicle. The other driving task (i.e., a controlling of the longitudinal guidance or the transverse guidance of the motor vehicle) in each case is carried out automatically. This means, therefore, that during assisted driving of the motor vehicle, either the transverse guidance or the longitudinal guidance is controlled automatically.

Semi-automated driving means that in a specific situation (for example: driving on an expressway, driving within a parking facility, passing an object, driving within a traffic lane defined by traffic lane markings) and/or for a certain period of time, a longitudinal guidance and a transverse guidance of the motor vehicle are controlled automatically. A driver of the motor vehicle him/herself does not have to manually control the longitudinal guidance and transverse guidance of the motor vehicle. However, the driver must continually monitor the automatic control of the longitudinal guidance and transverse guidance in order to be able to manually intervene if needed. The driver must be prepared to take full driving control of the motor vehicle at any time.

Highly automated driving means that for a certain period of time in a specific situation (for example: driving on an expressway, driving within a parking facility, passing an object, driving within a traffic lane defined by traffic lane markings), a longitudinal guidance and a transverse guidance of the motor vehicle are controlled automatically. A driver of the motor vehicle him/herself does not have to manually control the longitudinal guidance and transverse guidance of the motor vehicle. The driver does not have to continually monitor the automatic control of the longitudinal guidance and transverse guidance in order to be able to manually intervene if needed. If needed, a take-over request is automatically output to the driver for taking control of the longitudinal guidance and transverse guidance, in particular, with a sufficient time reserve. The driver must therefore potentially be able to take control of the longitudinal guidance and the transverse guidance. Limits of the automatic control of the transverse guidance and the longitudinal guidance are automatically recognized. During highly-automated driving, it is not possible to automatically bring about a minimal risk state in every initial situation.

Fully automated driving means that in a specific situation (for example: driving on an expressway, driving within a parking facility, passing an object, driving within a traffic lane defined by traffic lane markings), a longitudinal guidance and transverse guidance of the motor vehicle is controlled automatically. A driver of the motor vehicle him/herself does not have to manually control the longitudinal guidance and transverse guidance of the motor vehicle. The driver does not have to monitor the automatic control of the longitudinal guidance and transverse guidance in order to be able to manually intervene if needed. Prior to a termination of the automatic control of the transverse guidance and longitudinal guidance, a request is automatically made to the driver to assume the driving task (control of the transverse guidance and longitudinal guidance of the motor vehicle), in particular, with a sufficient time reserve. If the driver does not assume the driving task, a return to a minimal risk situation takes place automatically. Limits of the automatic control of the transverse guidance and longitudinal guidance are automatically recognized. In all situations, it is possible to return to a minimal risk system state.

A localization in real time is not necessary in the above-described situations. Instead, it is sufficient in the described situations to calculate the localization with a greater latency, for example, with multiple seconds. Based on a feature localization, it is provided to carry out the feature localization not in the vehicle, but with the aid of a mapping cloud, on which the mapping is carried out. After localization on cloud 200 is completed, localization data CD, with which the vehicle may be located and from which the vehicle generates operating data for carrying out a cooperative driving maneuver, are then transferred to the vehicle.

The described method and the described device are described in greater detail below with reference to figures.

Figure 1:
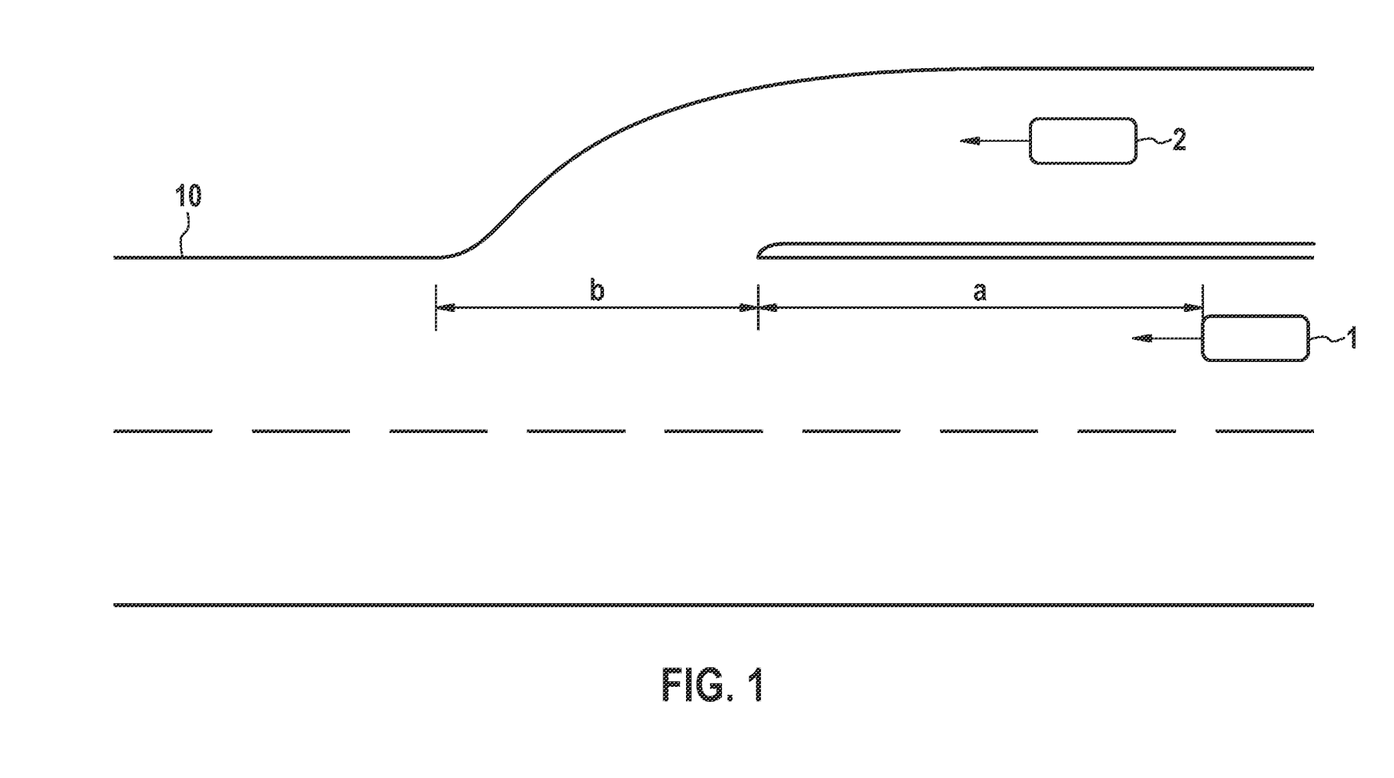
FIG. 1 shows an overview diagram including one operating mode of a method, according to an example embodiment of the present invention.

FIG. 1 shows a traffic situation, in which a vehicle 1 driving on a right-hand traffic lane of a roadway 10 approaches a lane change zone (for example, highway on-ramp). A vehicle 2 entering into the lane change zone is further apparent, which anticipates a cooperative driving maneuver on the part of vehicle 1, for example, by adapting the speed and/or by carrying out a traffic lane change on the part of vehicle 1. Driving directions of vehicles 1, 2 are indicated by directional arrows.

The described method for enabling a cooperative behavior on the part of vehicle 1 may proceed as follows:

once vehicle 1 enters into the lane change zone, i.e., into an area, in which a number of traffic lanes of roadway 10 changes (for example, highway on-ramps, road sections on rural roads, road sections before/after tunnels, road areas in which the vehicle's traffic lane ends, road areas in which an additional adjacent traffic lane is added, areas for passing maneuvers, etc.), a request for localization data together with surroundings data SD sensorially detected by surroundings sensors (for example, radar sensor) of vehicle 1 is conveyed to a cloud 200 (not shown in FIG. 1). In the process, vehicle 1 detects with the aid of at least one active or passive sensor (for example, radar sensor, LIDAR sensor, ultrasonic sensor, camera, etc.) surroundings data SD including static localization features 11 (for example, buildings, traffic signs, infrastructure objects, etc.).

a vehicle position of vehicle 1 is ascertained on cloud 200 based on a localization map stored in cloud 200 and on received sensorially detected surroundings data SD. In addition to received surroundings data SD, it may be meaningful to use GPS data ascertained by a GPS system of vehicle 1 and conveyed to cloud 200, from which an approximate position and/or a vehicle egomotion of the vehicle may be determined.

Thus, a recognition of static surroundings features ("static perception") is carried out by vehicle 1 with the aid of the on-board sensor system. Using sensorially detected surroundings data SD in combination with localization data CD received from cloud 200, an even more precise calculation of a distance a to the lane change zone may be carried out by vehicle 1 and a cooperative maneuver may be started and carried out as a function of these distance measures. This may involve, for example, vehicle 1, in view of sensorially recognized approaching vehicle 2, accelerating at least temporarily and/or decelerating at least temporarily and/or changing traffic lanes. Localization data CD provided by cloud 200 and conveyed to vehicle 1 may, for example, be distances between defined static objects and/or geographic coordinates of the defined static object, etc.

On the basis of the vehicle's traffic lane ascertained in the localization and on the longitudinal position in this lane, a distance a up to a lane change zone and length b of the lane change zone are ascertained in cloud 200 and corresponding data are conveyed to vehicle 1.

Optionally, it may be provided that distance a from vehicle 1 at the start of the lane change zone and length b of the lane change zone are displayed via an electronic horizon of vehicle 1 (for example, "lane change zone starts in 750 m," "length of the lane change zone is 30 m"). In vehicle 1, the distance covered may be ascertained in order to determine the remaining distance from an end of the traffic lane, for example, in the event that vehicle 1 has covered 300 m since the reception of localization data CD from cloud 200, the following message is displayed in the vehicle: "450 m remaining to the end of the lane" (this corresponds to 750 m-300 m). A cooperative driving maneuver may now be implemented by vehicle 1 in relation to approaching vehicle 2 as a function of aforementioned distances a, b and the position, speed and acceleration of approaching vehicle 2, by activating suitable actuators or sensors of vehicle 1.

As a result, approaching vehicle 2 is able to more easily approach roadway 10 due to the cooperative driving maneuver of vehicle 1, thereby facilitating a smoother traffic situation as a result.

Figure 2:
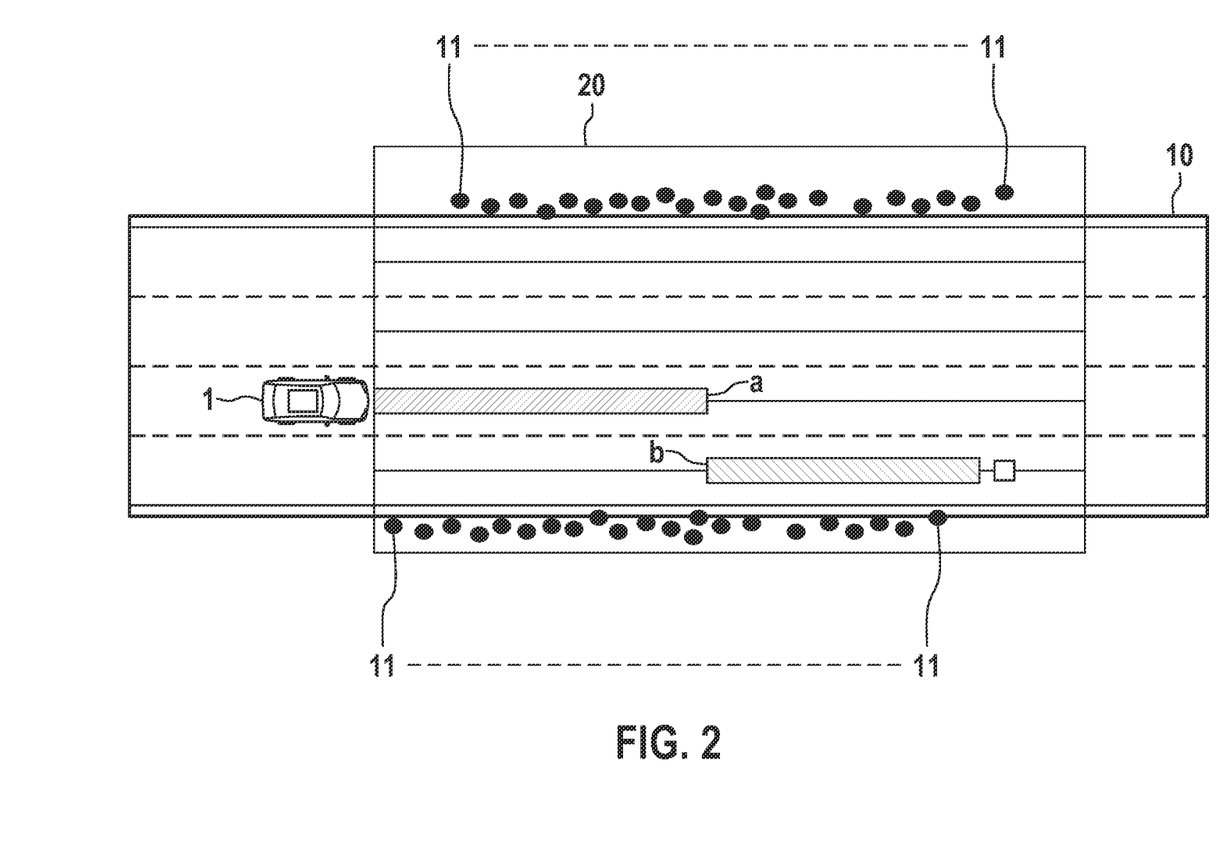
FIG. 2 shows an overview diagram including a detailed representation of the operating mode of the described method, according to an example embodiment of the present invention.

For example, the described method as indicated in FIG. 2 may be carried out per defined mapping area 20 of a digital map, so that for subsections of a route, highly up-to-date localization data CD are conveyed in each case from cloud 200 to vehicle 1.

Surroundings features or localization features 11 are further apparent in FIG. 2, which are detected with the aid of the surroundings sensor system of vehicle 1 and are processed to form surroundings data SD. Further apparent is distance a to the lane change zone as well as length b of the lane change zone.

Figure 3:
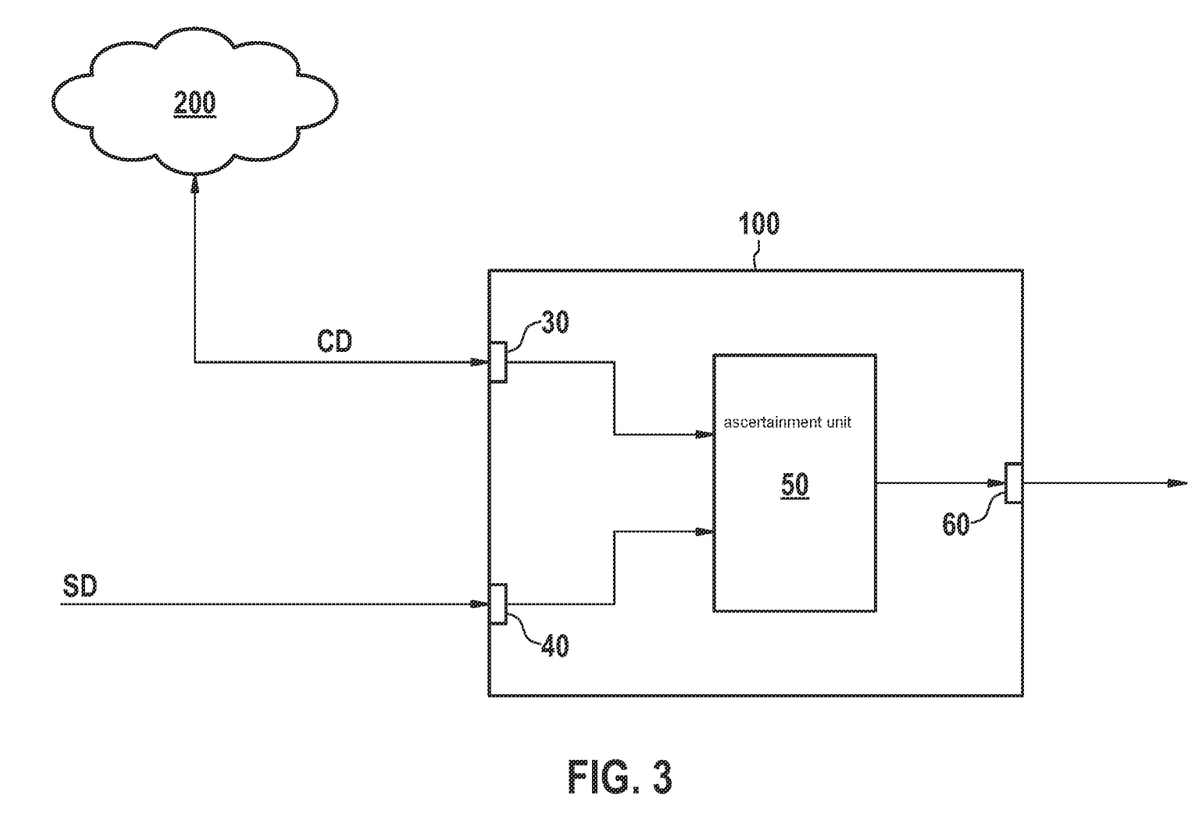
FIG. 3 shows a block diagram of a device according to an example embodiment of the present invention.

FIG. 3 shows a basic block diagram of one specific embodiment of a described device 100 for providing operating data. A first interface 30 for a functional wireless connection to cloud 200 is apparent. Further apparent is a second interface 40, via which surroundings data SD sensorially detected by vehicle 1 are fed to device 100.

An ascertainment unit 50 is further provided, which carries out an ascertainment of operating data based on localization data CD fed from cloud 200 and on sensorially detected surroundings data SD, which are output via a third interface 60 to a control unit (not shown) of vehicle 1, as a result of which the cooperative driving maneuver is able to be initiated and carried out by vehicle 1.

Device 100 and its elements may be designed at least partially in software and/or at least partially in hardware.

Figure 4:
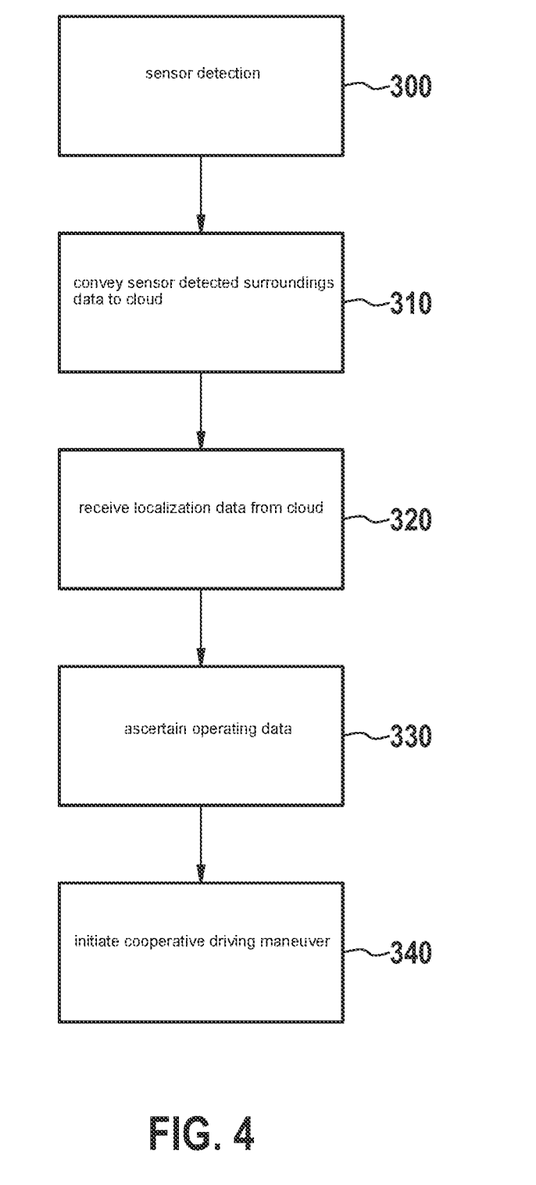
FIG. 4 shows a basic sequence of a described method for providing operating data of an at least semi-automated vehicle, according to an example embodiment of the present invention.

FIG. 4 shows a basic sequence of a described method.

In a step 300, a sensorial detection of surroundings data SD takes place with the aid of a surroundings sensor system of vehicle 1.

In a step 310, a conveyance of sensorially detected surroundings data SD to a cloud 200 and a conveyance of a request to cloud 200 for localization data CD are carried out.

In a step 320, a reception of localization data CD from cloud 200 takes place.

In a step 330, an ascertainment of the operating data for use in a cooperative driving maneuver of vehicle 1 with at least one further road user from localization data CD received from cloud 200 and from sensorially detected surroundings data SD takes place.

In a step 340, an initiation of the cooperative driving maneuver takes place using the ascertained operating data.

The ability to convey a low-resolution digital localization map from cloud 200 (including few localization features) to requesting vehicle 1 and to thereby save resources is advantageously facilitated with the described method.

On this basis, the desired cooperative behavior may now be implemented. In the process, the change of traffic lane is detected by the surroundings perception (for example, with the aid of a camera) and is taken into account in the maneuver planning.

The following advantages, for example, may be realized with the described method and with the described device.

minimal costs for data transfer from cloud 200 to vehicle 1, because no complete digital localization map is required to be transferred to vehicle 1, but merely a few specific localization features or localization data, minimal costs for the data storage in vehicle 1, because the digital localization map does not have to be stored in vehicle 1, a very computationally intensive localization step is not carried out in vehicle 1, as a result of which hardware/software in vehicle 1 may be saved, simple interface from cloud 200 to vehicle 1: because the digital localization map does not have to be transferred into vehicle 1, an electronic horizon, which is transferred once per lane end result to vehicle 1, is sufficient.

a module that provides the vehicle data corresponds to the module that is utilized for mapping purposes from the fleet data. As an advantage, no additional development effort is required.

digital map in the vehicle is required only for areas in which the number of traffic lanes changes. In this way, a mapping is not required for the entire road network, as a result of which it is advantageously possible to save costs in the mapping and updating of the map.

The described method may, for example, be implemented in a single front radar of vehicle 1 and, for example, may be integrated into an ACC system of vehicle 1. Traffic lanes disappear at the left or right roadway margin, as a result of which generally a sufficient number of radar localization features are visible, which are able to be detected by the front radar of vehicle 1 even in dense traffic.

A front radar also has an estimation of the ego motion, which drifts only slightly (<approximately 1%), for which reason resultant errors are non-critical, in order to implement the described method. Furthermore, Gen5 radar, for example, already has a module for collecting radar data, which may be conveyed to cloud 200.

It is advantageously possible to implement the method in software, as a result of which an efficient and easy adaptability of the method is facilitated.

When implementing the present invention, those skilled in the art will also implement specific embodiments not previously explained or only partially explained above.

What is claimed is:

1. A method for providing operating data for an at least semi-automated vehicle, comprising the following steps:
   locally storing in the vehicle a low-resolution digital localization map having map data at a first data resolution;
   sensorially detecting surroundings data using a surroundings sensor system of the vehicle;
   based on the sensorially detected surroundings data in view of the low-resolution digital localization map, over time making identifications, by the vehicle, of the vehicle entering respective ones of predefined mapping regions that are each drawn about a respective one of a plurality of lane change zones, wherein the lane change zones are each a respective area in which a number of lanes that are available to be driven changes;
   responding, by the vehicle, to each of the identifications by responsively requesting from a cloud respective cloud map data for increasing in the vehicle the map data for the respective identified mapping region to a second data resolution that is higher than the first resolution with respect to feature density, wherein, for each of the requests, the vehicle conveys a respective portion of the sensorially detected surroundings data to the cloud;
   for each of the requests, the vehicle responsively receiving from the cloud the respective cloud map data; and
   for each of one or more of the lane change zones:
      performing, by the vehicle, a refined localization of the vehicle according to the map data in the vehicle at the second data resolution;
      ascertaining, by the vehicle, the operating data for use in a cooperative driving maneuver of the vehicle with at least one further road user according to the refined localization and the sensorially detected surroundings data; and
      initiating, by the vehicle, the cooperative driving maneuver using the ascertained operating data.

2. The method as recited in claim 1, wherein the cloud map data received from the cloud include at least one of the following: distance of the vehicle up to one of the lane change zones and a length of the one of the lane change zones.

3. The method as recited in claim 1, wherein the sensorially detected surroundings data of the vehicle are detected using at least one of the following: radar sensor, LIDAR sensor, ultrasonic sensor, camera.

4. The method as recited in claim 1, wherein the cloud map data received from the cloud are displayed in an electronic horizon of the vehicle.

5. A non-transitory machine-readable memory medium on which is stored a computer program for providing operating data for an at least semi-automated vehicle, the computer program, when executed by a computer of the vehicle, causing the computer to perform the following steps:
   locally storing in the vehicle a low-resolution digital localization map having map data at a first data resolution;
   sensorially detecting surroundings data using a surroundings sensor system of the vehicle;
   based on the sensorially detected surroundings data in view of the low-resolution digital localization map, over time making identifications of the vehicle entering respective ones of predefined mapping regions that are each drawn about a respective one of a plurality of lane change zones, wherein the lane change zones are each a respective area in which a number of lanes that are available to be driven changes;
   responding to each of the identifications by responsively requesting from a cloud respective cloud map data for increasing in the vehicle the map data for the respective identified mapping region to a second data resolution that is higher than the first resolution with respect to feature density, wherein, for each of the requests, the vehicle conveys a respective portion of the sensorially detected surroundings data to the cloud;
   for each of the requests, responsively receiving from the cloud the respective cloud map data; and
   for each of one or more of the lane change zones:
      performing a refined localization of the vehicle according to the map data in the vehicle at the second data resolution;
      ascertaining the operating data for use in a cooperative driving maneuver of the vehicle with at least one further road user according to the refined localization and the sensorially detected surroundings data; and
      initiating the cooperative driving maneuver using the ascertained operating data.

6. A vehicle comprising:
   a memory locally storing a low-resolution digital localization map having map data at a first data resolution;
   one or more sensors; and
   a processor, wherein the processor is wirelessly communicatively coupled to a cloud and is configured to:

sensorially detect surroundings data using a surroundings sensor system of the vehicle, the surroundings sensor system including one or more sensors;

based on the sensorially detected surroundings data in view of the low-resolution digital localization map, over time making identifications, by the vehicle, of the vehicle entering respective ones of predefined mapping regions that are each drawn about a respective one of a plurality of lane change zones, wherein the lane change zones are each a respective area in which a number of lanes that are available to be driven changes;

respond to each of the identification by responsively requesting from the cloud respective cloud map data for increasing in the vehicle the map data for the respective identified mapping region to a second data resolution that is higher than the first resolution with respect to feature density, wherein, for each of the requests, the vehicle conveys a respective portion of the sensorially detected surroundings data to the cloud;

for each of the requests, receive from the cloud the respective cloud map data; and for each of one or more of the lane change zones:
perform a refined localization of the vehicle according to the map data in the vehicle at the second data resolution;
ascertain the operating data for use in a cooperative driving maneuver of the vehicle with at least one further road user according to the refined localization and the sensorially detected surroundings data; and
initiate the cooperative driving maneuver using the ascertained operating data.

7. The vehicle as recited in claim 6, wherein the vehicle includes a display, and the processor is configured to output on the display a representation of the cloud map data received from of the cloud using an electronic horizon of the vehicle.

8. The vehicle as recited in claim 6, further comprising:
an electronic horizon, with which the cloud map data conveyed by the cloud is signaled.

* * * * *